A. B. & E. O. HOEFELMAN.
PEDAL LOCK FOR AUTOMOBILES.
APPLICATION FILED DEC. 23, 1916.
1,225,130.
Patented May 8, 1917.
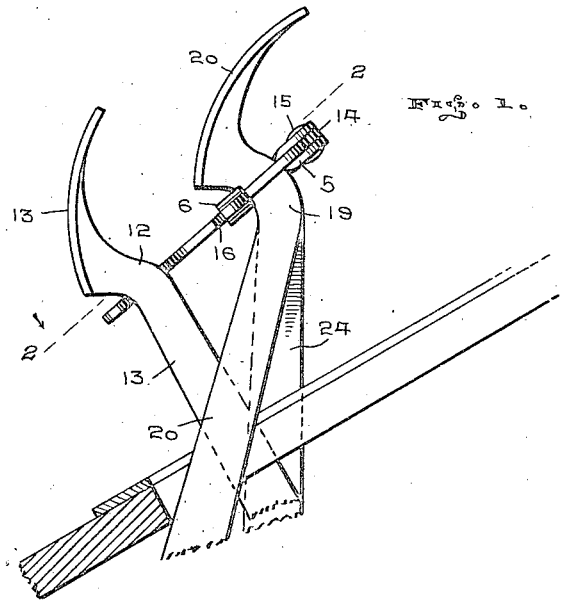
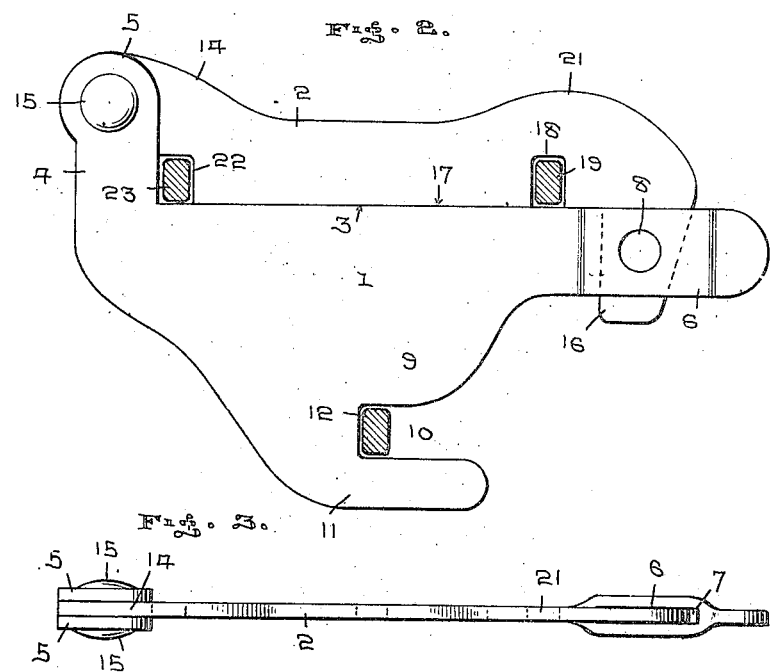
Inventors
A. B. Hoefelman, E. O. Hoefelman
By W. J. FitzGerald & Co.
Attorneys

UNITED STATES PATENT OFFICE.

ADOLPH B. HOEFELMAN AND ERNST O. HOEFELMAN, OF PLATTE CENTER, NEBRASKA.

PEDAL-LOCK FOR AUTOMOBILES.

1,225,130. Specification of Letters Patent. Patented May 8, 1917.

Application filed December 23, 1916. Serial No. 138,539.

*To all whom it may concern:*

Be it known that we, ADOLPH B. HOEFELMAN and ERNST O. HOEFELMAN, citizens of the United States, residing at Platte Center, in the county of Platte and State of Nebraska, have invented certain new and useful Improvements in Pedal-Locks for Automobiles; and we do hereby declare the following to be a full, clear, and exact description of the invention, such as will enable others skilled in the art to which it appertains to make and use the same.

This invention relates to a safety pedal lock and has for it principal object the provision of a lock of this character adapted particularly for use in connection with motor vehicles, wherein there is used a forward speed pedal, a reverse pedal, and a brake pedal, said lock being so designed that it can be readily and quickly attached to and locked around said pedals so as to lock all of them against relative movement.

A further object of the invention is the provision of a safety pedal lock of the above stated character which is of simple and inexpensive construction, of durable and substantial design, and one which may be readily and quickly attached to the neck portions of the vehicle pedals so as to lock any particular pedal or all of said pedals against movement, thus preventing the motor vehicle from being thrown into gear with the the engine thereof.

With these and other objects in view as will appear as the description proceeds, the invention comprises the various novel features of construction, combination and arrangement of parts as will be more fully described hereinafter and set forth with particularity in the appended claim.

Referring to the drawings,

Figure 1 is a sectional elevational view showing our improved pedal lock arranged in position upon the shank necks of the motor vehicle operating pedals.

Fig. 2 is a sectional plan view taken on the line 2—2 of Fig. 1, and

Fig. 3 is a side elevation of the pedal shown in Fig. 2.

Similar characters of reference are used to denote like parts throughout the accompanying drawings and the following description.

Referring more particularly to the drawings, our improved safety pedal lock is shown to consist of two elongated members 1 and 2 respectively. The member 1 is provided with a straight inner edge 3. The rear end portion of this elongated member 1 is provided with a right angular extension 4, the outer end of which is bifurcated to provide a pair of ears 5, said ears being apertured for a purpose which will presently appear.

The forward end portion of the member 1 is thickened as indicated by the numeral 6 and is provided with a transversely extending slot 7 which extends entirely through this thickened portion, said thickened portion being provided with alining apertures 8 that extend entirely therethrough.

The intermediate portion of this elongated member 1 is widened as indicated by the numeral 9, and extending inwardly from one side of this widened portion is a rearwardly and longitudinally extending slot or recess 10 which is disposed at a slight angle with respect to the straight inner edge 3. By the formation of this recess 10, a finger 11 is formed which is designed to embrace and hold the shank neck 12 of the reverse pedal 13 securely within the recess 10.

The elongated member 2 is provided at its rear end with an angular extension 14, said extension being apertured and designed to be arranged between the ears 5 and pivotally held in such position through the medium of a pivotal rivet or other suitable pivoting means 15.

The forward end of the member 2 is provided with an angular apertured extension or tongue 16 which is designed to be engaged through the slot 7 in order that the straight inner edge 17 of the member 2 may be folded over and against the edge 3, as clearly shown in Fig. 2 of the drawings. When the tongue 16 is engaged through the slot 7 the aperture of this tongue is designed to be arranged in alinement with the apertures 8 so that a suitable lock, not shown, may be engaged through these apertures in order to securely and lockingly retain the forward ends of the members 1 and 2 in locked position with each other.

The inner edge of the member 2 is provided with an inwardly extending slot or recess 18 adjacent the tongue 16, which is designed to receive the pedal shank neck 19 of the brake pedal 20. In order to reinforce this forward portion of the member 2 at the point where it is provided with the recess 18, it is enlarged or widened as indicated by the numeral 21.

The inner rear end portion or corner of the elongated member 2 is cut away to provide a recess 22, which is designed to coöperate with the crotch formed by the angular extension 4 with the inner inclined edge 3, to provide an opening designed to receive the pedal neck shank 23 of the forward speed pedal 24.

From the foregoing it will be apparent that when it is desired to attach our improved pedal lock to the pedals of a motor vehicle, it is simply necessary to engage the finger 11 around the reverse pedal shank neck 12 and then swing the elongated member 2 around into abutting relation with the member 1 so that each of the pedal shank necks 23 and 19 will be positioned with the recesses 22 and 18 respectively, said recesses being closed by the inner straight edge 3 of the member 1 and the angular extension 4. Immediately after the members have been folded together, a suitable lock is passed through the alined apertures 8 to lock the forward ends of the members 1 and 2 together.

In view of the fact that the pedal shanks are arranged in somewhat staggered relation to each other, it will be apparent that when the pedal lock has been applied in locked position around the angular neck portions 19, 23 and 12 of the pedal shanks it will be impossible to push any one of these pedals in an attempt to throw the machine into gear, and an attempt to do so will immediately cause a binding action between the lock and the pedal shanks, thus preventing the pedals from being actuated.

What we claim is:

A safety pedal lock of the class described consisting of a pair of flat elongated members, one of said flat members formed with a right angular extension having its outer end slotted, said flat member having its opposite end thickened and provided with a transverse slot, and also having that portion between its ends widened and provided with a recess extending in longitudinally from one side to provide a longitudinally extending finger, the other of said flat elongated members having a longitudinal extension at one end pivotally mounted in the slotted outer end of said right angular extension of the first flat member, and having its opposite end provided with a right angular tongue disposed oppositely to the extension of the first flat member and adapted to project through said slotted thickened portion, said second flat member also having recesses in its inner longitudinal edge, and means for securing said right angular tongue in said slotted thickened end portion of the first flat member.

In testimony whereof we have signed our names to this specification in the presence of two subscribing witnesses.

ADOLPH B. HOEFELMAN.
ERNST O. HOEFELMAN.

Witnesses:
P. L. KELLY,
E. C. HOEFELMAN.